US007835866B2

(12) United States Patent
Tzidon

(10) Patent No.: US 7,835,866 B2
(45) Date of Patent: Nov. 16, 2010

(54) METHOD FOR AIRCRAFT POSITION PREDICTION BASED ON AIRCRAFT CHARACTERISTICS

(75) Inventor: Aviv Tzidon, Tel Aviv (IL)

(73) Assignee: ST Electronics (Training & Simulation Systems) Pte Ltd., Singapore (SG)

( * ) Notice: Subject to any disclaimer, the term of this patent is extended or adjusted under 35 U.S.C. 154(b) by 282 days.

(21) Appl. No.: 10/554,862

(22) PCT Filed: Nov. 14, 2003

(86) PCT No.: PCT/SG03/00269

§ 371 (c)(1),
(2), (4) Date: Jan. 19, 2007

(87) PCT Pub. No.: WO2004/097766

PCT Pub. Date: Nov. 11, 2004

(65) Prior Publication Data

US 2007/0156297 A1    Jul. 5, 2007

Related U.S. Application Data

(60) Provisional application No. 60/465,765, filed on Apr. 28, 2003.

(51) Int. Cl.
*G08G 1/16* (2006.01)
(52) U.S. Cl. .................... 701/301; 701/14; 340/945
(58) Field of Classification Search .......... 701/14, 701/301; 342/455, 456
See application file for complete search history.

(56) References Cited

U.S. PATENT DOCUMENTS

| 4,046,341 | A | * | 9/1977 | Quinlivan | 244/181 |
| 4,254,465 | A | * | 3/1981 | Land | 701/220 |
| 5,136,512 | A | | 8/1992 | Le Borne | |
| 5,596,332 | A | * | 1/1997 | Coles et al. | 342/455 |
| 5,892,462 | A | * | 4/1999 | Tran | 340/961 |
| 6,452,511 | B1 | * | 9/2002 | Kelly et al. | 340/970 |
| 6,473,676 | B2 | * | 10/2002 | Katz et al. | 701/4 |
| 6,538,581 | B2 | | 3/2003 | Cowie | |
| 2004/0250616 | A1 | * | 12/2004 | Adebjork et al. | 73/170.02 |

FOREIGN PATENT DOCUMENTS

| DE | 3929581 A | 3/1991 |
| WO | WO 92/21077 A | 11/1992 |
| WO | WO 96/05562 A1 | 2/1996 |

OTHER PUBLICATIONS

PCT International Search Report for International Application No. PCT/SG03/00269 mailed Dec. 23, 2003, 8 pages. Issued by Australian Patent Office, PO Box 200, Woden, ACT 2606, Australia.

* cited by examiner

*Primary Examiner*—Mark Hellner
*Assistant Examiner*—Helal A Algahaim
(74) *Attorney, Agent, or Firm*—Blakely, Sokoloff, Taylor & Zafman LLP

(57) ABSTRACT

Method for predicting a future position of an aircraft based on the physical characteristics of the aircraft, and by monitoring aircraft manoeuvres, the system analyzes pilot controls movements to predict future pilot control movements. The set of such future commands are fed to a 6-Degree Of Freedom (DOF) simulation to enable the determination of future aircraft position. A corresponding system is also disclosed.

27 Claims, 2 Drawing Sheets

METHOD FOR AIRCRAFT POSITION PREDICTION BASED ON AIRCRAFT CHARACTERISTICS

CROSS-REFERENCE TO OTHER APPLICATIONS

This is a National Phase of International Application No. PCT/SG2003/000269, filed on Nov. 14, 2003, which claims priority from U.S. Provisional Patent Application No. 60/465,765, filed on Apr. 28, 2003.

FIELD OF THE INVENTION

This invention relates to a method for aircraft position prediction based on aircraft characteristics and refers particularly, though not exclusively, to such a method for prediction and monitoring of aircraft positions for collision warning.

BACKGROUND TO THE INVENTION

Many systems that provide warnings for possible mid-air collisions of aircraft use extrapolation of previous the aircraft flight vectors, and attempt to evaluate the distance between the two aircraft based on futuristic vectors. For commercial aircraft the flight profile is predictable so the rate of false alarms is relatively small. This is not the case for high maneuverability aircraft such as for example, fighter jets and training aircraft where the G-force capabilities are more than 3G, and can be up to 9G. Extrapolation for such aircraft gives many false alarms, even if non-linear extrapolation is used. Errors in extrapolation are sufficiently large thereby creating high false alarm rates. This influences pilots not to trust such warnings, quite often with fatal results. It also leads to predictions that are quite erroneous thus giving pilots a false sense of security.

SUMMARY OF THE INVENTION

In one aspect of the invention there is provided a method for predicting a future position of an aircraft by
(a) monitoring manoeuvres of the aircraft;
(b) analyzing the aircraft pilot's control inputs;
(c) using known characteristics of the aircraft; and
(d) using (a), (b) and (c) to predict future pilot control inputs to predict the future position.

Preferably, the pilot control inputs are analyzed using the following aircraft data:
aircraft position,
aircraft velocity vector,
aircraft attitude angles,
aircraft toll rate,
aircraft turn acceleration factor, and
aircraft angle of attack.

In step (a) current pilot inputs may also be assumed; and in step (b) current pilot tactics may also be determined.

More preferably, the aircraft thrust (i.e. longitudinal acceleration) may also be monitored. Monitoring, analyzing and prediction may be in real time. The aircraft thrust may be analyzed to determine the maneuvering and acceleration limits. The aircraft's performed manoeuvres may be analyzed over the manoeuvres available for aircraft of that type to be able to gain an indication of the performance characteristics of the pilot.

The results of the analysis of the aircraft's performed manoeuvres may be compared with a heuristic pilot control table to determine in which phase of flight the aircraft is in at that time. A set of predicted future pilot controls may be created and fed into a six degrees of freedom simulation software to give as a result a predicted future aircraft flight path. The set of predicted future pilot controls may be created by combining a result of the comparison with the heuristic pilot control table with the analysis of the aircraft thrust.

Pitch and yaw rates can be continuously measured, and rate of change of each of aircraft velocity, angle of attack and turn acceleration factor may be determined by filtering their continuously supplied values.

The future position of the aircraft may be used for collision avoidance application.

In accordance with a further aspect of the invention, there is provided a computer usable medium comprising a computer program code that is configured to cause a processor to perform the method described above.

In a final aspect of the invention there is provided a system for predicting a future position of an aircraft, the system comprising:
(a) a processor for receiving monitoring inputs for monitoring manoeuvres of the aircraft;
(b) the processor receiving analysis inputs for analyzing the aircraft pilots control inputs;
(c) a memory for storing known characteristics of the aircraft; and
(d) the processor being for using the monitoring inputs, the analysis inputs and the known characteristics to predict future pilot control inputs to predict the future position.

In this final form the pilot control inputs may be analyzed along with aircraft data consisting of aircraft position, aircraft velocity vector, aircraft attitude angles, aircraft roll rate, aircraft turn acceleration factor, and aircraft angle of attack.

There may also be provided means for monitoring the aircraft thrust; and all monitoring, analyzing and prediction may be in real time.

There may be further included a database for aircraft of the same type as the aircraft, the aircraft's position and the manoeuvres performed by the aircraft being monitored over time and compared to entries in the database.

The aircraft thrust may be analyzed to determine the aircraft thrust needed to perform each manoeuvre. The aircraft's performed manoeuvres may be analyzed over the manoeuvres available for aircraft of that type to be able to gain an indication of the performance characteristics of the pilot.

There may be further included a heuristic pilot control table, the results of the analysis of the aircraft's performed manoeuvres being compared with the heuristic pilot control table to determine in which phase of flight the aircraft is in at that time.

A set of predicted future pilot controls may be provided. The set may be created by combining a result of the comparison with the heuristic pilot control table with the analysis of the aircraft thrust. The set of predicted future pilot controls may be inputs to a six degrees of freedom simulation to give as a result a predicted future aircraft flight path.

Pitch and yaw rates may be continuously measured.

There may be included a filter for filtering the continuously supplied values of aircraft velocity, angle of attack and turn acceleration factor to provide their rates of change. Also, the future position of the aircraft may be used for collision avoidance application.

For all aspects the heuristic pilot control table may comprise at least one of: flight limitations, combat flight practice considerations, and pilot performance characteristics.

DESCRIPTION OF THE DRAWINGS

In order that the invention may be readily understood and put into practical effect, there shall now be described by way of non-limitative example only preferred embodiments of the present invention, the description being with reference to the accompanying illustrative drawings, in which.

DETAILED DESCRIPTION OF THE PREFERRED EMBODIMENTS

With the present invention, in order to provide a more enhanced prediction of future positions of the aircraft. The following aircraft data may be monitored:
aircraft position;
aircraft velocity vector;
aircraft attitude angles;
aircraft roll rate;
aircraft turn acceleration factor; and
aircraft angle of attack.

Other parameters may also be taken into account such as, for example aircraft thrust.

By entering the aircraft data as measured, and the accumulated knowledge of pilots reactions and aircraft performance into a six degrees of freedom ("6DOF") simulation, it is possible to more accurately determine what the pilot is doing, what is happening, what the pilot is likely to do, and therefore where the aircraft is likely to be headed and how it will get there.

Figure 1:
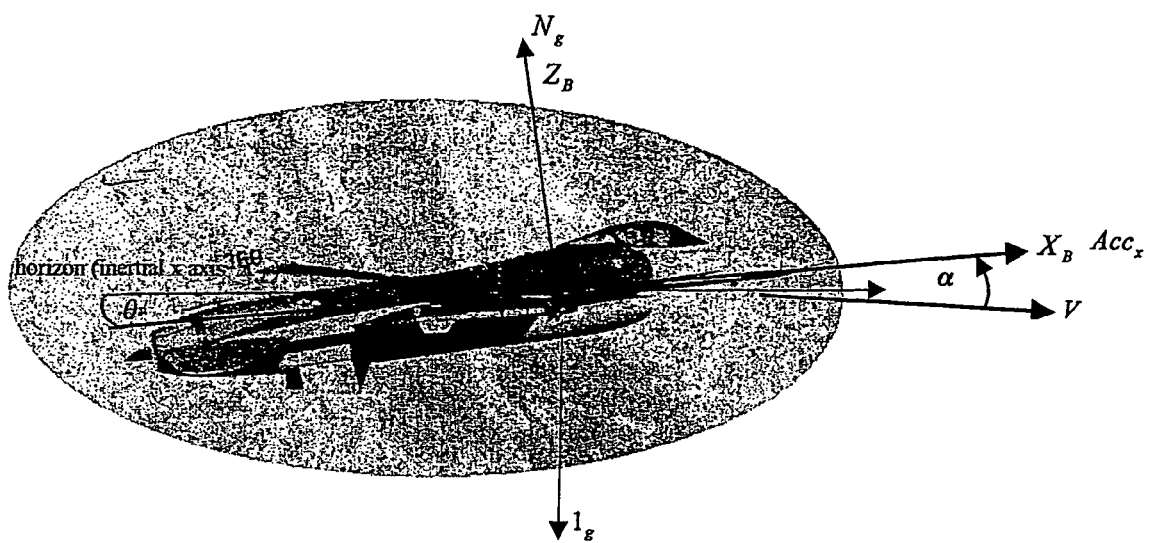
FIG. 1 is an illustration of an aircraft in flight showing some of the parameters being measured.

For example, FIG. 1 shows an aircraft in flight in FIG. 1, V is the aircraft air speed, and it is at an angle of $\propto$ degrees under the body's x-axis. $Acc_x$ is acceleration in the direction of the body's x-axis and coincides with the x body axis. Ng is lift and is perpendicular to the x body.

When the pilot wants to climb, he pulls back on the control stick. This first changes the angle of attack of the aircraft—it pivots about the wings, with the tail dropping and the nose lifting. The change in the angle of attack changes the drag on the aircraft—in this case the change is to increase drag, thereby reducing the speed of the aircraft.

Therefore, by monitoring the angle of attack it is possible to predict the aircraft's changed direction and speed before, or at the commencement of, the aircraft's climb. This may be before the decrease. In speed of the aircraft. This is therefore more predictive of the future position of the aircraft.

Naturally, if the pilot of the aircraft increase the thrust, the aircraft's speed will increase. But the angle of attack and direction will not change. By monitoring and storing the factors, over a period of time, the behaviour of the pilot becomes predictable when one of the degrees of freedom is changed.

Therefore, utilizing knowledge of the pilot's previous control inputs, assumptions of current pilot inputs, current pilot tactics, and data on the aircraft, it is possible to predict new positions of the aircraft. Since data of the control inputs is monitored and input to a six degrees of freedom simulation, the resultant predictions of future aircraft movement and positions are outcomes of the performance of the aircraft.

Using the example given above in relation to FIG. 1, if the pilot always increases thrust when climbing, and the increase in thrust is always by the same amount for each rate of climb, when a particular change in the angle of attack is detected the system can predict that the pilot will increase the thrust by a certain amount given the particular change in the angle of attack. Therefore, by recording past pilot performance and the resulting aircraft performance, and given a new pilot input, it is possible to predict the aircraft performance. It is also possible to predict new performances of the pilot, particularly when the performance characteristics of the aircraft are also known.

The engine thrust itself is not measured, but the maximum and minimum acceleration, deceleration, climb rate, turn acceleration factor (Ng), and performance of the specific aircraft type, are of recorded. They can be estimated by Vdot estimation together with the aircraft flight envelope performance manual, current Ng, and the pressure at the altitude of the aircraft.

The accuracy of the estimation of the aircraft's position may be enhanced by taking into account the specific aircraft performance capabilities. Therefore, rather than trying to estimate the path of the aircraft in the future. It is more preferable to estimate how the pilot will fly the aircraft in the future. By entering the futuristic inputs into 6DOF simulation it is possible to determine where the aircraft may be in the near future. By doing so the aircraft performance and capabilities are taken in account.

An aircraft's flight path is the result of pilot's input, the input normally being by movements of the control stick. The stick movements create changes of roll rate and angle of attack. A new angle of attack creates new values of lift and drag that influence the aircraft's position. By translating the rate of change of roll rate and angle of attack the pilot's desired flight path can be more accurate determined.

For example: if an F-16 at a speed of 260 Knots and at 20,000 feet starts to manoeuvre in a left turn
the manoeuvre starts at 1 G;
the second pull is at 2 G; and
the next pull is at 4 G;

using known flight prediction systems that rely on mathematical extrapolation will give 6 G and 8 G for the following pulls of the turn. For an F-16, the maximum is 9 G. However, at that altitude the aircraft cannot manoeuvre at more than 4 G. The induced, or resulting, increase in drag will also effect the speed such that it drops to 210 Knots. This will decrease the maximum turn rate available to 3 G. Over 5 seconds, the distance between the predicted flight path using known mathematical extrapolation, and the actual flight path, will be more than 250 meters. This is sufficient to enable a collision to be avoided; or to happen.

The preferred procedure is divided into two main routines:
1. analyzing over time the aircraft position and the manoeuvres performed by the aircraft and comparing these to entries in the database relating to the specific aircraft type:
    (a) estimating and/or sampling consequences of changes in aircraft thrust and analyzing what aircraft thrust is needed to perform each manoeuvre;
    (b) analyzing the aircraft's performed manoeuvres over the manoeuvres available for aircraft of that specific type to be able to gain an indication of the performance characteristics of the pilot For example, does he take the aircraft to the limit of its performance capabilities?;
    (c) comparing the result of (b) with a heuristic pilot control table, in order to determine in which phase of flight the aircraft is in at that time;
    (d) creating a set of predicted future pilot controls by combining the results of (a) and (c);

The heuristic pilot control table may be more than an application and implementation of flight limitations in a flight manual. It may also contain combat flight practice considerations such as those described below after equation (10).

Another such consideration may be pilot performance characteristics such as, for example, a pilot may never perform a high G turn of more than 400 degrees continuously, and may have the tendency to turn to the left more frequently than to the right, and so forth.

2. the set of predicted future pilot controls is considered in light of the following parameters that are required as inputs:
   a. aircraft position
   b. aircraft velocity vector
   c. aircraft attitude angles ($\psi$, $\theta$, $\phi$)
   d. roll rate (P)
   e. turn acceleration factor (Ng); and
   f. angle of attack ($\propto$).

Ignoring second or higher orders of the aircraft short period dynamic response, the trajectory induced (quasi steady state) pitch and yaw rates can be continuously determined. The rate of change of each of aircraft velocity, angle of attack and turn acceleration factor are also determined by filtering their continuously supplied values. Filtering may be by use of a discrete filter and derivative formula. With this data, it is possible to integrate the aircraft equations of motion. The considerations of the aircraft are taken at its center of gravity. Carrying out the desired integration, continuously enables aircraft trajectory predictions to be made.

By aircraft dynamic response is meant that a first order of dynamics is used instead of a second or higher order. As the interest is in aircraft future trajectory i.e. velocity (first integration of equations of motion), it is possible to reduce the aircraft dynamic model.

Figure 2:
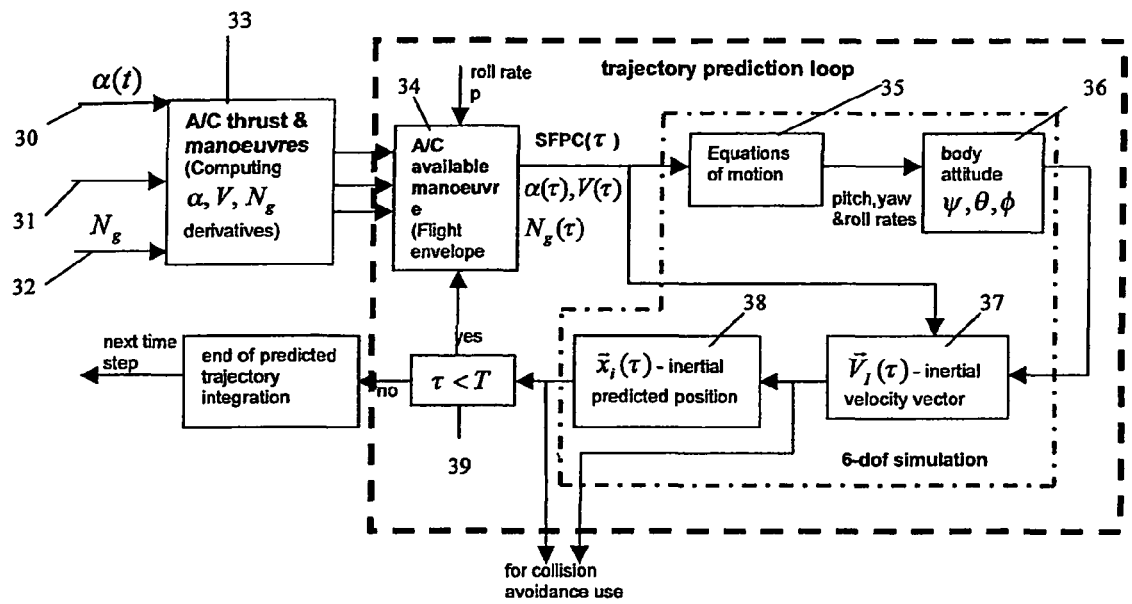
FIG. 2 is a basic flow chart of the system operation.

As shown in FIG. 2, the angle of attack ($\propto$), aircraft velocity (V) and aircraft turn acceleration factor (Ng) are recorded on a regular and periodic basis. At each time t, they are monitored and input at steps 30, 31 and 32 respectively The next step 33 is estimating engine thrust i.e. the longitudinal acceleration (in the velocity vector direction) $\dot{V}$. This is done by differentiating and filtering the velocity V:

$$\hat{\dot{V}}_i = \hat{\dot{V}}_{i-1}(1-\Delta t/\tau_V) + (V_i - V_{i-1})/\tau_v \quad (1)$$

where $V_i$—current sample of V
$V_{i-1}$, $\hat{\dot{V}}_{i-1}$—previous sample of V and the previous estimation of its time derivative;
$\tau_V$—characteristic velocity time constant for the specific aircraft (normally 1 to 2 seconds); and
$\Delta t$—time step between the last two samples The longitudinal acceleration can also be obtained from the aircraft longitudinal accelerometer (if available) and the angle of attack according to the following equation:

$$\hat{\dot{V}} = Acc_x * \cos(\alpha) - N_g * g * \sin(\alpha) \approx Acc_x - N_g * g * \alpha \quad (2)$$

where $Acc_x$—aircraft longitudinal acceleration; and
g—gravitation acceleration The next step 34 has as inputs the $\propto$, V, Ng derivatives, the roll rate P, and the "yes" result of the query at step 39 (see below). In step 34 the aircrafts' manoeuvre and pilot intentions are analyzed (equivalent to longitudinal stick motion) by estimating the time derivative of the angle of attack. This uses a similar operation to the velocity time derivative in equation (1) above:

$$\hat{\dot{\alpha}}_i = \hat{\dot{\alpha}}_{i-1}(1-\Delta t/\tau_\alpha) + (\alpha_i - \alpha_{i-1})/\tau_\alpha \quad (3)$$

where $\alpha_i$—current sample of angle of attack;
$\alpha_{i-1}$, $\hat{\dot{\alpha}}_{i-1}$—previous sample of $\alpha$ and its previous time derivative estimation; and
$\tau_\alpha$—characteristic angle of attack time constant (normally 0.5-1 second)

The time derivative of $N_g$ can also be estimated in similar way:

$$\hat{\dot{N}}_{gi} = \hat{\dot{N}}_{g\,i-1}(1-\Delta t/\tau_g) + (N_{g\,i} - N_{g\,i-1})/\tau_g \quad (3)$$

Now starts the trajectory prediction loop that is the larger dashed-line rectangle on FIG. 2. This uses a one-time step $d\tau$ integration of $\alpha$, V, $N_g$. At the first step j=1, $\tau$=0 and the initial conditions of $\hat{\alpha}_0$, $\hat{V}_0$, $\hat{N}_{g0}$ are set to their measured values $\alpha_i$, $V_i$, $N_{g\,i}$. Their time derivative values $\hat{\dot{\alpha}}_0$, $\hat{\dot{V}}_0$, $\hat{\dot{N}}_{g0}$ are set to their calculated values at equations (1), (3), (4) above. Accordingly with the aircraft flight envelope [velocity, acceleration, turn acceleration, and maximum angle of attack, as function of velocity (mach number) and altitude] the values of $\hat{\dot{\alpha}}_{j-1}$, $\hat{\dot{V}}_{j-1}$, $\hat{\dot{N}}_{g,j-1}$, are limited to their extreme possible values:

$$\text{If } \alpha_{min} \geq \hat{\alpha}_{j-1} \text{ or } \hat{\alpha}_{j-1} \geq \alpha_{max} \text{ then } \hat{\dot{\alpha}}_j = 0 \quad (5)$$

$$\text{If } N_{g\,min} \geq \hat{N}_{g\,j-1} \text{ or } \hat{N}_{g\,j-1} \geq N_{g\,max} \text{ then } \hat{\dot{N}}_{g\,j} = 0 \quad (6)$$

$$\text{If } V_{min} \geq \hat{V}_{j-1} \text{ or } \hat{V}_{j-1} \geq V_{max} \text{ then } \hat{\dot{V}}_j = 0 \quad (7)$$

Longitudinal acceleration is limited to its extreme possible value expected from the specific aircraft flight envelope performance manual (if available) depending on current airspeed, climbing rate, Ng, and pressure altitude:

$$\text{If } \hat{\dot{V}}_j \geq \dot{V}_{max} \text{ then } \hat{\dot{V}}_j = \dot{V}_{max}$$

$$\text{If } \hat{\dot{V}}_j \leq \dot{V}_{min} \text{ then } \hat{\dot{V}}_j = \dot{V}_{min}$$

$\dot{V}_{max}$—is the maximum available velocity direction acceleration (equivalent to applying maximum available engine thrust).
$\dot{V}_{min}$—is the minimum available velocity direction acceleration i.e. maximum deceleration (equivalent to applying minimum engine thrust).

One step integration is used to get new values of $\hat{\alpha}$, $\hat{V}$, $\hat{N}_g$:

$$\hat{\alpha}_j = \hat{\alpha}_{j-1} + d\tau * \hat{\dot{\alpha}}_j \quad (8)$$

$$\hat{V}_j = \hat{V}_{j-1} + d\tau * \hat{\dot{V}}_j \quad (9)$$

$$\hat{N}_{g\,j} = \hat{N}_{g\,j-1} + d\tau * \hat{\dot{N}}_{g\,j} \quad (10)$$

As the roll motion of any aircraft is much more brisk than its pitch motion, the roll motion should not be treated in the same way as for pitch and longitudinal motions. Roll motion is more accurately referred to as a short transient motion. By applying practical flight tactics considerations it is possible to predict the roll rate during the predicted trajectory calculations. For example, it can be assumed that the pilot will roll the aircraft to start a turn manoeuvre when the roll rate is high and the $N_g$ is low. In this case, the roll motion will stop after a 90° roll. When the pilots intention is to invert his turn rate, the roll motion is accompanied with high $N_g$, so the roll motion will stop after 180°. According to these assumptions, the current roll rate should be held until the aircraft completes a 90° (or 180°) roll. The roll rate can then be set to zero. So the roll rate has to be integrated during the predicted trajectory calculations as follows:

$$\hat{p}_0 = p_i \quad (11)$$

$p_i$—the aircraft measured roll rate at time step $t_i$
Initial condition of roll angle $\phi$ $$\phi_0 = 0 \quad (12)$$

$$\text{if } |\phi_{j-1}| \geq 90° \text{ (or } 180°\text{) then } \hat{p}_j = 0 \text{ else } \hat{p}_j = \hat{p}_0 \quad (13)$$

$$\phi_j = \phi_{j-1} + \hat{p}_j * d\tau \quad (14)$$

If the helmet-sight bore-sight direction is available, some more practical flight tactics considerations can be applied to refine the Set of Future Pilot Control (SFPC) due to the correlation between pilot head position and future manoeuvres. Now starts the six degrees of freedom simulation with the integration of the equations of motion as follows:

In steps 35 and 36, the aircraft predicted Euler's angles are:

$$\hat{\phi}_j = \hat{p}_{j-1} + (\hat{q}_{j-1} * \sin \hat{\phi}_{j-1} + \hat{r}_{j-1} * \cos \hat{\phi}_{j-1}) * \tan \hat{\theta}_{j-1} \quad (15)$$

$$\hat{\theta}_j = \hat{q}_{j-1} * \cos \hat{\phi}_{j-1} - \hat{r}_{j-1} * \sin \hat{\phi}_{j-1} \quad (16)$$

$$\hat{\psi}_j = (\hat{q}_{j-1} * \sin \hat{\phi}_{j-1} + \hat{r}_{j-1} * \cos \hat{\phi}_{j-1}) / \cos \hat{\theta}_{j-1} \quad (17)$$

$$\hat{\phi}_j = \hat{\phi}_{j-1} + \hat{\phi}_j * d\tau \quad (18)$$

$$\hat{\theta}_j = \hat{\theta}_{j-1} + \hat{\theta}_j * d\tau \quad (19)$$

$$\hat{\psi}_j = \hat{\psi}_{j-1} + \hat{\psi}_j * d\tau \quad (20)$$

$\hat{\phi}_0, \hat{\theta}_0, \hat{\psi}_0$ are the measured aircraft Euler's angles at time step $t_i$.

$\hat{q}_0, \hat{r}_0$ are the measured aircraft pitch and yaw rates at time step t.

$\hat{p}_0$ was already defined at (11) above.

Equations 15 and 17 involve division by cosine of the pitch angle to obtain the aircraft roll and yaw angles. A question of singularity exists when aircraft is pitched at or near plus or minus 90 degrees. Most aircraft do not normally manoeuvre near vertically pitched attitude. The quternion system may be used instead of the euler angles, but the use of euler angles is simpler and more intuitive. The singularity may be overcome by limiting the value of cosine teta to be a small value—epsilon times the sign of teta.

The velocity vector in body coordinates is:

$$V_B = \{V^* \cos(\alpha), 0, -V^* \sin(\alpha)\}$$

With the approximation of small angles we get:

$$V_B = \{V, 0, -V^* \alpha\}$$

$Z_B$ is in the up direction, and $Y_B$ is to the left of the aircraft.

To obtain get the velocity vector in the inertial coordinates system the body system is rotated by three sequential angles: $-\phi$ around $X_B$, $-\theta$ around new $Y_B$ axis and $-\psi$ around new $-Z_B$ axis. The $V_B$ vector is multiplied with the inverse of the well-known transfer matrix (DCM) from inertial coordinates to body coordinates $T_{BI}^{-1}$ to obtain equations (21) through (23) below.

The aircraft predicted-velocity components in the inertial system are (step 37)

$$\hat{V}_{IXj} = \hat{V}_j * [\cos \hat{\theta}_j * \cos \hat{\psi}_j - \hat{\alpha}_j * (\cos \hat{\phi}_j * \sin \hat{\theta}_j * \cos \hat{\psi}_j + \sin \hat{\phi}_j * \sin \hat{\psi}_j)] \quad (21)$$

$$\hat{V}_{IYj} = \hat{V}_j * [\cos \hat{\theta}_j * \sin \hat{\psi}_j - \hat{\alpha}_j * (\cos \hat{\phi}_j * \sin \hat{\theta}_j * \sin \hat{\psi}_j - \sin \hat{\phi}_j * \cos \hat{\psi}_j)] \quad (22)$$

$$\hat{V}_{IZj} = \hat{V}_j * (-\sin \hat{\theta}_j - \hat{\alpha}_j * \cos \hat{\phi}_j \cdot \cos \hat{\theta}_j) \quad (23)$$

The aircraft predicted trajectory point coordinates in the inertial system are (step 38):

$$\hat{X}_j = \hat{X}_{j-1} + \hat{V}_{IXj} * d\tau \quad (24)$$

$$\hat{Y}_j = \hat{Y}_{j-1} + \hat{V}_{IYj} * d\tau \quad (25)$$

$$\hat{Z}_j = \hat{Z}_{j-1} + \hat{V}_{IZj} * d\tau \quad (26)$$

$\hat{X}_0, \hat{Y}_0, \hat{Z}_0$ are the aircraft inertial coordinates at time step $t_i$ (computed in the navigation system):

$$F_{XB}/m = \dot{V}_{XB} + q * V_{ZB} - r * V_{YB} \quad (a)$$

$$F_{YB}/m = \dot{V}_{YB} + r * V_{XB} - p * V_{ZB} \quad (b)$$

$$F_{ZB}/m = \dot{V}_{ZB} + p * V_{YB} - q * V_{XB} \quad (c)$$

m is the aircraft mass
p, q, r are the body angular rates around $X_B, Y_B, Z_B$ axis respectively Assuming coordinated flight (as pilots usually do):

$$V_{YB} = 0, \dot{V}_{YB} \approx 0 \quad (d)$$

As the angle of attack is a small angle (less than 20°)

$$V_{ZB} = V^* \sin(\alpha) \approx V^* \alpha \quad (e)$$

Derivation of $V_{ZB}$:

$$\dot{V}_{ZB} = \dot{V}^* \alpha + V^* \dot{\alpha} \quad (f)$$

$$F_{ZB} = g * (\hat{N}_g - \cos \phi_j * \cos \theta_j) \quad (g)$$

(see FIG. 1 above)

Substituting (d), (f) & (g) into (c) provides equation (27) below.

The aircraft predicted pitch and yaw rates for the next prediction time step $\tau_{j+1}$ are:

$$\hat{q}_j = [-\hat{\alpha}_j * \hat{V}_j - g * (\hat{N}_g - \cos \phi_j * \cos \theta_j)] / \hat{V}_j - \hat{\alpha}_j \quad (27)$$

$$F_{YB} = -g * \sin \phi_j * \cos \theta_j \quad (h)$$

Substituting (d) (e) & (h) into (b) provides equation (28).

$$\hat{r}_j = -\hat{p}_j * \hat{\alpha}_j - g * \sin \phi_j * \cos \theta_j / \hat{V}_j$$

The last step is advancing the prediction time (step 39):

if $\tau_{j-1} < \tau_g$ then $\tau_j = \tau_{j-1} + d\tau$ else end the predicted trajectory computation. (29)

The initial condition is:

$$\tau_0 = 0 \quad (30)$$

$\tau_f$—is the maximum prediction time needed

As such all necessary monitoring, calculations and determinations can be performed in real time to enable predictions of future aircraft positions to be made.

The present invention also extends to a computer usable medium comprising a computer program code that is configured to cause a processor to execute one or more functions to enable the above method to be performed.

Whilst there has been described in the foregoing description a preferred embodiment of the present invention, it will be understood by those skilled in the technology concerned that many variations or modifications in details of design, construction or operation may be made without departing from the present invention.

The invention claimed is:

1. A method for predicting a future position of an aircraft with a processor, the method comprising the steps:
   (a) monitoring manoeuvres of the aircraft using measurements of acceleration, deceleration, climb rate, turn acceleration factor, aircraft position;
   (b) analyzing the aircraft pilot's control inputs;
   (c) analyzing aircraft data comprising:
       aircraft position,
       aircraft velocity vector,
       aircraft attitude angles,
       aircraft roll rate,
       aircraft turn acceleration factor, and
       aircraft angle of attack;
   (d) determining rate of change of each of aircraft velocity, angle of attack and turn acceleration factor by filtering their continuously supplied values;
   (e) using known characteristics of the aircraft; and
   (f) using (a), (b), (c), (d), and (e) to predict future pilot control inputs to predict the future position and to provide collision warning.

2. A method as claimed in claim 1, wherein the aircraft thrust is also analysed or monitored.

3. A method as claimed in claim 1, wherein in step (a) current pilot inputs are also assumed.

4. A method as claimed in claim 1, wherein in step (b) current pilot tactics are also determined.

5. A method as claimed in claim 1, wherein monitoring, analyzing and prediction is in real time.

6. A method as claimed in claim 1, wherein the aircraft's position and the manoeuvres performed by the aircraft are monitored over time and compared to entries in a database for aircraft of the same type as the aircraft.

7. A method as claimed in claim 5, wherein the aircraft thrust is analyzed to determine the aircraft thrust needed to perform each manoeuvre.

8. A method as claimed in claim 1, including analyzing the aircraft's performed manoeuvres over the manoeuvres available for aircraft of that type to be able to gain an indication of the performance characteristics of the pilot.

9. A method as claimed in claim 8, wherein the results of the analysis of the aircraft's performed manoeuvres are compared with a heuristic pilot control table to determine in which phase of flight the aircraft is in at that time.

10. A method as claimed in claim 9, further including creating a set of predicted future pilot controls by combining a result of the comparison with the heuristic pilot control table with the analysis of the aircraft thrust.

11. A method as claimed in claim 10, wherein the set of predicted future pilot controls are inputs to a six degrees of freedom simulation to give as a result a predicted future aircraft flight path.

12. A method as claimed in claim 1, wherein pitch and yaw rates can be continuously measured.

13. A method as claimed in claim 1, wherein the future position of the aircraft is used for collision avoidance application.

14. A method as claimed in claim 9, wherein the heuristic pilot control table comprises at least one of: flight limitations, combat flight practice considerations, and pilot performance characteristics.

15. A computer usable medium comprising a computer program code that is configured to cause a processor to perform the method of claim 1.

16. A system for predicting a future position of an aircraft, the system comprising:
   (a) a processor for receiving monitoring inputs for monitoring manoeuvres of the aircraft using measurements of acceleration, deceleration, climb rate, turn acceleration factor, aircraft position, wherein the monitoring inputs are aircraft data comprising:
      aircraft position;
      aircraft velocity vector;
      aircraft attitude angles;
      aircraft roll rate;
      aircraft turn acceleration factor; and
      aircraft angle of attack;
   (b) the processor receiving analysis inputs for analyzing the aircraft pilot's control inputs;
   (c) a filter for filtering the continuously supplied values of aircraft velocity, angle of attack and turn acceleration factor to provide their rates of change;
   (d) a memory for storing known characteristics of the aircraft; and
   (e) the processor for using the monitoring inputs, the analysis inputs and the known characteristics to predict future pilot control inputs to predict the future position and to provide collision warning.

17. A system as claimed in claim 16, further including means for analysing or monitoring the aircraft thrust.

18. A system as claimed in claim 16, wherein monitoring, analyzing and prediction is in real time.

19. A system as claimed in claim 16, further including a database for aircraft of the same type as the aircraft, the aircraft's position and the manoeuvres performed by the aircraft being monitored over time and compared to entries in the database.

20. A system as claimed in claim 19, wherein the aircraft thrust is analyzed to determine the aircraft thrust needed to perform each manoeuvre.

21. A system as claimed in claim 16, including analyzing the aircraft's performed manoeuvres over the manoeuvres available for aircraft of that type to be able to gain an indication of the performance characteristics of the pilot.

22. A system as claimed in claim 21, further including a heuristic pilot control table, the results of the analysis of the aircraft's performed manoeuvres being compared with the heuristic pilot control table to determine in which phase of flight the aircraft is in at that time.

23. A system as claimed in claim 22, further including a set of predicted future pilot controls created by combining a result of the comparison with the heuristic pilot control table with the analysis of the aircraft thrust.

24. A system as claimed in claim 23, wherein the set of predicted future pilot controls are inputs to a six degrees of freedom simulation to give as a result a predicted future aircraft flight path.

25. A system as claimed in claim 16, wherein pitch and yaw rates are continuously measured.

26. A system as claimed in claim 16, wherein the future position of the aircraft is used for collision avoidance application.

27. A system as claimed in claim 22, wherein the heuristic pilot control table comprises at least one of: flight limitations, combat flight practice considerations, and pilot performance characteristics.

* * * * *